US012650263B2

(12) United States Patent
Reichert

(10) Patent No.: US 12,650,263 B2
(45) Date of Patent: Jun. 9, 2026

(54) SINTERING FURNACE

(71) Applicant: Amann Girrbach AG, Koblach (AT)

(72) Inventor: Axel Reichert, Widnau (CH)

(73) Assignee: Amann Girrbach AG, Koblach (AT)

( * ) Notice: Subject to any disclaimer, the term of this patent is extended or adjusted under 35 U.S.C. 154(b) by 786 days.

(21) Appl. No.: 17/433,705

(22) PCT Filed: Feb. 21, 2020

(86) PCT No.: PCT/AT2020/000004
§ 371 (c)(1),
(2) Date: Aug. 25, 2021

(87) PCT Pub. No.: WO2021/127714
PCT Pub. Date: Jul. 1, 2021

(65) Prior Publication Data
US 2022/0136773 A1     May 5, 2022

(30) Foreign Application Priority Data

Feb. 27, 2019     (AT) ................................. GM 17/2019

(51) Int. Cl.
| | |
|---|---|
| *F27B 17/02* | (2006.01) |
| *A61C 13/20* | (2006.01) |
| *E06B 7/28* | (2006.01) |
| *F27D 5/00* | (2006.01) |
| *F27D 11/02* | (2006.01) |

(Continued)

(52) U.S. Cl.
CPC ............ *F27B 17/025* (2013.01); *A61C 13/20* (2013.01); *E06B 7/28* (2013.01); *F27D 5/0043* (2013.01); *F27D 11/02* (2013.01); *F27D*

*99/0006* (2013.01); *H05B 3/08* (2013.01); *H05B 2203/016* (2013.01)

(58) Field of Classification Search
CPC .......... F27B 17/025; A61C 13/20; E06B 7/28; F27D 5/0043; F27D 11/02; F27D 99/0006; H05B 3/08; H05B 2203/016
USPC .......................................................... 219/406
See application file for complete search history.

(56) References Cited

U.S. PATENT DOCUMENTS

| | | | | | |
|---|---|---|---|---|---|
| 2,218,961 | A | * | 10/1940 | Schulz | .................... F24C 3/027 126/41 R |
| 4,398,702 | A | * | 8/1983 | Lueth | ........................ B22F 3/15 266/207 |

(Continued)

FOREIGN PATENT DOCUMENTS

| | | |
|---|---|---|
| CN | 202350512 | 7/2012 |
| CN | 202350534 | 7/2012 |

(Continued)

*Primary Examiner* — Elizabeth M Kerr
*Assistant Examiner* — Simpson A Chen
(74) *Attorney, Agent, or Firm* — Volpe Koenig

(57) ABSTRACT

A sintering furnace (1) for sintering dental workpieces (2), wherein the sintering furnace (1) has a heating element (3) with a receiving space (4) for receiving the workpiece (2) during sintering. The receiving space (4) is a portion of an interior space (5) within the heating element (3), and the heating element (3) comprises or consists of silicon carbide, wherein the heating element (3) is designed, at least in parts, as a slotted tube, and the slot (6) in the tube forming the heating element (3) has a helical configuration in a heating region (7), in which the heating element (3) encloses the receiving space (4).

8 Claims, 1 Drawing Sheet

(51) Int. Cl.
    *F27D 99/00*       (2010.01)
    *H05B 3/08*        (2006.01)

(56)            References Cited

U.S. PATENT DOCUMENTS

| | | | |
|---|---|---|---|
| 2008/0309211 A1 * | 12/2008 | Wilson | F24C 15/02 |
| | | | 312/410 |
| 2010/0047731 A1 | 2/2010 | Zubler | |
| 2011/0006450 A1 * | 1/2011 | Stephan | A61C 13/203 |
| | | | 264/16 |
| 2011/0114626 A1 | 5/2011 | Serrago et al. | |
| 2012/0267830 A1 | 10/2012 | Maginnis et al. | |
| 2015/0069042 A1 | 3/2015 | Serrago et al. | |
| 2017/0176103 A1 | 6/2017 | Fornoff et al. | |
| 2018/0051931 A1 | 2/2018 | Fornoff et al. | |

FOREIGN PATENT DOCUMENTS

| | | | | |
|---|---|---|---|---|
| CN | 202350534 U | * | 7/2012 | |
| CN | 203432325 | | 2/2014 | |
| CN | 103340693 | | 3/2015 | |
| CN | 207055563 U | | 3/2018 | |
| CN | 207066101 | | 3/2018 | |
| CN | 108716853 A | * | 10/2018 | |
| DE | 102006032655 | | 1/2008 | |
| DE | 202011003179 | | 4/2012 | |
| EP | 3132217 | | 4/2018 | |
| EP | 3256804 | | 10/2019 | |
| JP | S5373895 A | | 6/1978 | |
| JP | S60249948 A | | 12/1985 | |
| JP | H09115651 A | * | 5/1997 | |
| JP | H09293583 | | 11/1997 | |
| JP | 2001257056 A | * | 9/2001 | |
| JP | 2008296237 A | | 12/2008 | |
| WO | 2009020378 | | 2/2009 | |

* cited by examiner

SINTERING FURNACE

INCORPORATION BY REFERENCE

The following documents are incorporated herein by reference as if fully set forth: International Application No. PCT/AT2020/000004, filed Feb. 21, 2020.

TECHNICAL FIELD

The present invention relates to a sintering furnace for sintering dental workpieces, where the sintering furnace comprises a heating element having a receiving space for accommodating the workpiece during sintering and the receiving space is a subregion of an interior space in the interior of the heating element and the heating element comprises silicon carbide or consists thereof.

BACKGROUND

Sintering furnaces for sintering dental workpieces are known in many forms in the prior art. EP 3 132 217 B1 describes various configurational variants of sintering furnaces. In one variant, a crucible, for example composed of silicon carbide, is provided and is inductively heated from the outside by a circumferential coil. FIG. 5 of this document shows, in highly schematic form, a heating element in the form of a wire-like heating coil in the interior space of which the receiving space for accommodating the workpiece during sintering is arranged.

SUMMARY

It is an object of the invention to configure a sintering furnace of the abovementioned type with a very high efficiency, so that rapid high-temperature sintering is possible using this furnace.

To achieve this object, the invention provides for the heating element to be configured, at least in regions, as slotted tube and the slot in the tube forming the heating element to have a helical configuration in a heating region in which the heating element surrounds the receiving space.

The configuration of the heating element as tube which is slotted at least in regions, with the slot having a helical configuration in the heating region, provides a sintering furnace which is suitable for providing with high efficiency, very quickly, the very high temperatures required for high-temperature sintering, so that the heating times can, at a justifiable energy consumption, be kept very short in order to be able to sinter the dental workpieces very quickly at very high temperatures using the furnace of the invention. Sintering temperatures of up to 1600° C. are preferably achieved in the receiving space which is surrounded by the heating region of the heating element. The heating rates of sintering furnaces according to the invention are advantageously in the range from 5° C./min to 350° C./min. A variety of dental workpieces such as tooth crowns, onlays, bridges, artificial teeth, etc., can be sintered in sintering furnaces according to the invention. The heating element is preferably an active heat generator or an active heating device which generates heat from electric energy. It is preferably a resistive heating element, i.e. a heating element which generates heat when an electric current is passed through. As a result of the receiving space for accommodating the workpiece being arranged in the interior space of this heating element during sintering, the entire receiving space can be brought very quickly to the required sintering temperature.

The heating element can comprise silicon carbide or consist entirely thereof. The use of a tube which is helically slotted in the heating region has the advantage over the heating elements in the form of wire coils known from the abovementioned prior art that a spatially very uniform, appropriately high temperature distribution can be produced in the receiving space using relatively little electric energy, so that the high temperatures required for rapid sintering of the workpiece are available everywhere in the receiving space. Due to the configuration of the heating region as helically slotted tube, a significantly more uniform high temperature distribution is achieved within the receiving space than in the case of a heating element according to the prior art configured as wire coil.

In this context, it is preferred that at least in the heating region in which the slot in the tube has a helical configuration, a ratio of a width of the slot to a width of a web of the slotted tube arranged between two adjacent sections of the slot is in a range from 1:1 to 1:10, preferably from 1:3 to 1:7. In other words, the webs of the slotted tube between in each case two adjacent slots are at least as wide and preferably wider than the slots or the slot in the heating region, that is to say in the region in which the slot in the tube has a helical configuration. The webs here are the wall regions of the slotted tube which glow during operation of the heating element so as to produce the required temperature in the receiving space.

In order to concentrate the heat required for sintering in the receiving space, preferred variants of the invention provide for the interior space in the interior of the heating element apart from the receiving space to be filled at least partly with thermally insulating material, preferably with chamotte.

Even though it is not absolutely necessary, preferred variants of the invention nevertheless provide for the heating element to be arranged horizontally in an operating position of the sintering furnace. A longitudinal axis of the tube forming the heating element thus advantageously runs horizontally in the operating position. The tube is advantageously a hollow cylinder, preferably having a circular base area and an appropriately configured slot or appropriately configured slots in the cylindrical wall.

The heating element preferably comprises a connecting region in addition to the heating region, with slots which are elongated, preferably linearly, in a longitudinal direction of the heating element being present in the tube forming the heating element in the connecting region. The heating region in which the slot in the tube forming the heating element has a helical configuration is part of the heating element which is made to glow during operation. It could also be referred to as hot zone. The connecting region of the heating element, on the other hand, does not glow during operation of the sintering furnace in preferred embodiments. The connecting region is instead a region of the heating element in which the heating element is held in the sintering furnace and can be electrically connected. In this context, electric connections of the heating element are advantageously present in an end of the connecting region opposite the heating region. The slots extending longitudinally in the connecting region divide the tubular heating element into two electrically separate regions in the connecting region, with an electric connection being able to be connected to each of these regions. The longitudinally extended slots present in the connection region can run in a straight line, i.e. linearly, or else have another shape. These slots in the connecting region are in any case advantageously not helical, so that the heating element is not heated, as is the case in the heating region, in the connection region when electric current flows through. Via the electric connections of the heating element, electric current is advantageously fed into the heating element so that this electric current flows through the heating element in the connecting region and in the heating region, by which means the heating region can be appropriately heated, preferably made to glow, in order to generate the necessary heat. Since the connecting region is not heated like the heating region during operation of the sintering furnace, the connecting region advantageously serves both to fasten the heating element in the sintering furnace and to connect the electric connections. The connecting region is advantageously at least as long as and preferably longer than the heating region. In this context, a ratio of a longitudinal extension of the heating region in the longitudinal direction of the heating element to a longitudinal extension of the connecting region is preferably from 1:1 to 1:5, more preferably from 1:2 to 1:4. The total length of the heating element is advantageously in the range from 150 mm to 300 mm.

In sintering furnaces according to the invention, the heating element preferably has an introduction opening for introducing the workpiece to be sintered into the receiving space, where the introduction opening can be closed by a preferably linearly movably mounted furnace door of the sintering furnace. In this context, it is particularly advantageous for a workpiece carrier to be fixed on the furnace door, where the workpiece to be sintered can be introduced resting on the workpiece carrier into the receiving space and can rest on the workpiece carrier during the sintering operation. The workpiece carrier can be a body which is extended in a tongue-like manner and preferably projects from the furnace door. The workpiece carrier preferably consists of silicon carbide. The workpiece carrier is advantageously arranged so that the workpiece resting thereon is preferably centrally located in the receiving space in the closed position of the furnace door.

The sintering furnace preferably comprises a chamber wall composed of thermally insulating material and a furnace chamber surrounded by the chamber wall, where the heating element is arranged in the furnace chamber and the chamber wall is at a distance from the heating element at least in regions in the heating region. Adverse effects both in the heating element and the chamber wall are avoided by this spacing between the heating region of the heating element and the chamber wall of the furnace chamber. However, the possibility of the heating element directly contacting the chamber wall is not ruled out. The spacing between chamber wall and heating element is advantageously from 0 mm to 30 mm, at least in regions in the heating region.

BRIEF DESCRIPTION OF THE DRAWINGS

Further features and details of preferred embodiments of the invention will be explained with the aid of a working example of a sintering furnace according to the invention in the following description of figures. The figures show.

DETAILED DESCRIPTION

Figures 1, 2, 3, 4:
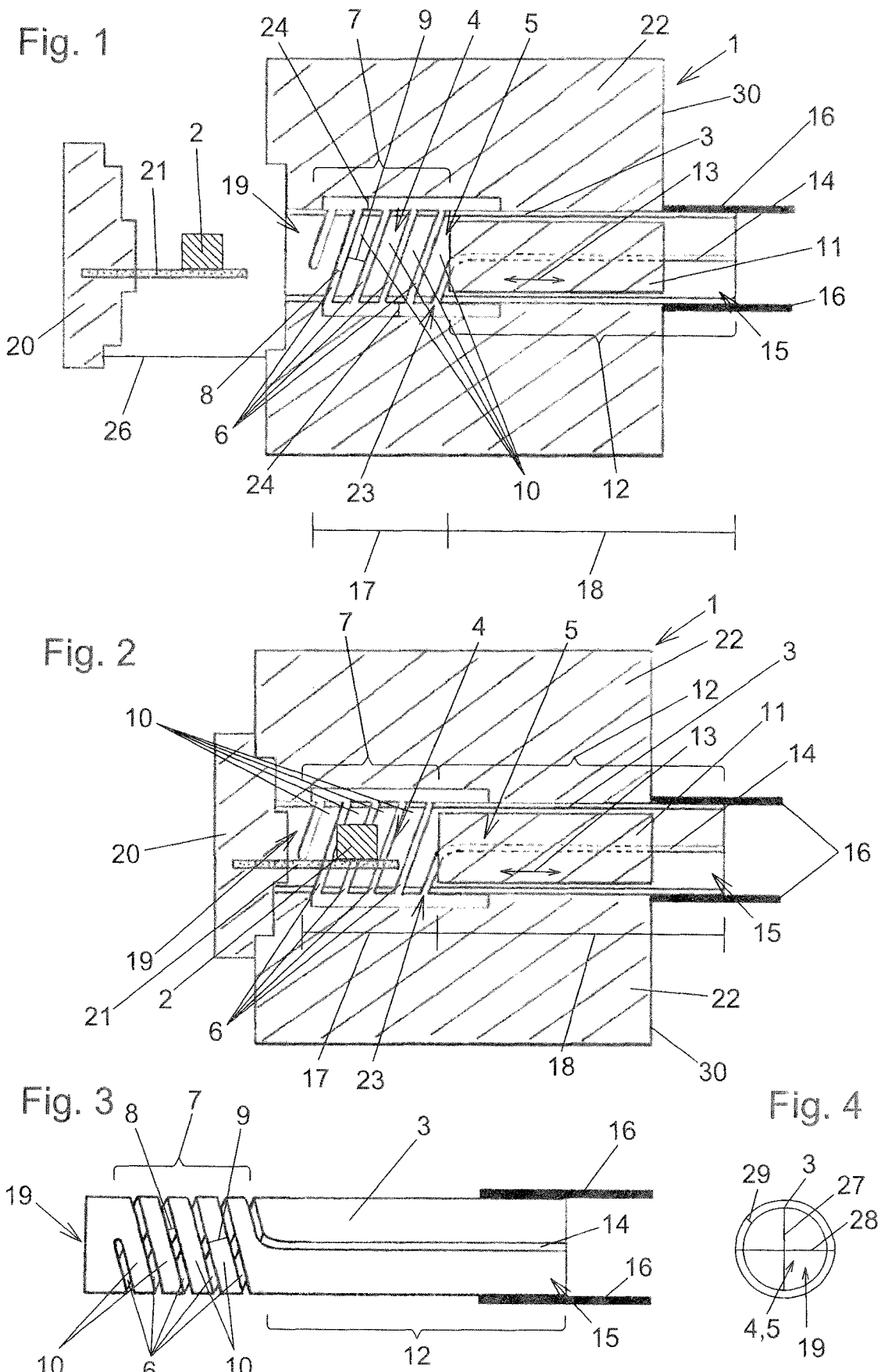
FIG. 1 a schematic sectional view through the working example of a sintering furnace according to the invention in the opened state.
FIG. 2 this working example in the closed state.
FIG. 3 a side view of the heating element used in FIGS. 1 and 2.
FIG. 4 a frontal view of this heating element in the region of the introduction opening.

FIGS. 1 and 2 show the working example of the sintering furnace 1 according to the invention in a schematic vertical section. The sintering furnace 1 here has a housing 30 which is shown only very schematically and a chamber wall 22 surrounding a furnace chamber 23. The chamber wall 22 can, for example, consist of chamotte or another suitable, thermally insulating material. The heating element 3 of the sintering furnace 1 is located in the furnace chamber 23. The heating element 3 is, according to the invention, configured as a tube which is slotted at least in regions. The slot 6 in the tube forming the heating element 3 has a helical configuration in the heating region 7. The heating region 7 is the part of the heating element 3 which surrounds the receiving space 4 for accommodating the workpiece 2 during sintering. The receiving space 4 is a subregion of the interior space 5 in the interior of the heating element 3. In the embodiment shown here, the heating element 3 is made entirely of silicon carbide except for electric connections 16. In the heating region 7 in which the slot 6 in the tube has a helical configuration, the slot 6 has, in preferred embodiments, a width 8 in the range from 2 mm to 10 mm. The webs 10 of the slotted tube arranged between two in each case adjacent slots 6 or windings of a slot 6 have, in preferred variants of the invention, a width 9 of advantageously from 2 mm to 25 mm. The width 9 of the webs 10 is advantageously at least as great as, advantageously greater than, the width 8 of the helical slot 6. As indicated at the outset, the ratio of the width 8 of the slot 6 and the width 9 of a web 10 arranged between two adjacent sections of the slot 6 in the heating region 7 is advantageously in the range from 1:1 to 1:10, preferably from 1:3 to 1:7. Due to the webs which are relatively broad compared to the slots, a homogeneous spatial heat distribution within the receiving space 4 is ensured during the sintering operation. It can readily be seen in FIGS. 1 and 2 that the heating element 3 is arranged horizontally in the operating position of the sintering furnace 1. In the regions of the heating element 3 outside the heating region 7, preferred embodiments of the invention provide for the interior space 5 in the interior of the heating element 3 to be at least partly filled with thermally insulating material 11. This thermally insulating material 11 is preferably chamotte. As a result of the filling of the interior space 5 in the interior of the heating element, apart from the receiving space 4, with thermally insulating material 11, the heat generated in the heating region 7 of the heating element 3 is concentrated in the region which is required for the sintering process, namely the receiving space 4.

In advantageous variants, for example the embodiment shown here, the heating element 3 has a connecting region 12 in addition to the heating region 7. In the connecting region 12, slots 14 which are longitudinally extended, preferably linearly, are advantageously provided in the longitudinal direction 13 of the heating element 3. The connections 16 of the heating element 3 via which electric energy or electric current can be supplied to the heating element are advantageously located at the end 15 of the connecting region 12 opposite the heating region 7. The connecting region 12, which is significantly cooler than the heating region 7 during operation of the sintering furnace 1 can be utilized for fastening the heating element 3 in the sintering furnace 1 there. In addition, the connecting region 12 ensures that the electric connections 16 are sufficiently far from the heating region 7 so as not to be impaired or destroyed. The connecting region 12 is, viewed in the longitudinal direction 13 of the heating element 3, advantageously at least as long as or preferably longer than the heating region 7. As mentioned at the outset, preferred embodiments provide for the ratio of a longitudinal extension 17 of the heating region 7 in the longitudinal direction 13 of the heating element 3 to a longitudinal extension 18 of the connecting region 12 to be from 1:1 to 1:5, preferably from 1:2 to 1:4.

All slotted regions of the tube forming the heating element 3 can consist of a single continuous slot 6 or 14. However, it is equally possible for there to be a plurality of slots 6 or 14 in the tube.

The chamber wall 22 of the sintering furnace 1, which consists of thermally insulating material, is in preferred embodiments such as that shown here at a distance from the heating element 3 at least in regions in the heating region, so that a negative effect occurs neither in the heating element 3 nor in the chamber wall 22. As indicated at the outset, direct contact of the heating element 3 with the chamber wall 22 is, however, not ruled out. The spacing 24 between the heating element 3 or the heating region 7 thereof and the chamber wall 22 is advantageously in the range from 0 mm to 30 mm.

In advantageous embodiments such as that shown here, an introduction opening 19 through which the workpiece 2 to be sintered can be introduced into the receiving space 4 within the heating element 3 and taken out from this again after conclusion of the sintering operation is located at the end of the heating region 7 opposite the connecting region 12. The introduction opening 19 can preferably be closed by a furnace door 20 of the sintering furnace. The furnace door 20 is preferably a furnace door which can be moved linearly on the housing 30 of the sintering furnace. In FIG. 1, the sintering furnace 1 is in the open state in which the furnace door 20 leaves the introduction opening 19 free. In FIG. 2, the sintering furnace 1 is in the closed state in which the sintering operation is carried out. In this closed state as shown in FIG. 2, the furnace door 20 closes the introduction opening 19. The linear guide 26 provided in this working example, by which the furnace door 20 can be moved back and forth between the open position as shown in FIG. 1 and the closed position as shown in FIG. 2, is depicted only schematically in FIG. 1 and can be configured as is known per se from the prior art.

In the working example shown here, as in other preferred variants, a workpiece carrier 21 is fixed to the furnace door 20. As a consequence, the workpiece carrier 21 is moved together with the furnace door 20 when the furnace door 20 is moved back and forth between the closed position and the open position. The workpiece 2 to be sintered rests on the workpiece carrier 21 so as to be introduced into the receiving space 4 for the sintering operation. During the sintering operation, the workpiece 2 rests on the workpiece carrier 21. The workpiece carrier 21 advantageously has, as indicated at the outset, a tongue-like and longitudinally extended configuration, as can be readily seen in FIGS. 1 and 2. The workpiece carrier 21 preferably likewise consists of silicon carbide. As can be readily seen in FIG. 2, the workpiece 2 to be sintered is held in a more or less central position in the receiving space 4 within the heating element 3 or within the heating region 7 by the workpiece carrier 21 during the sintering operation.

FIG. 3 once again shows the heating element 3 used in FIGS. 1 and 2 but without the other components of the sintering furnace 1. Once again, the helical configuration of the slot 6 in the heating region 7 of the tubular heating element 3 can readily be seen. In the connecting region 12, on the other hand, the slot 14 is configured on both sides as linearly extending slot, so that a short circuit between the two electric connections 16 on the rear end 15 of the connecting region 12, or the end 15 of the connecting region 12 opposite the heating region 7, does not occur.

FIG. 4 shows a view from the front of the tubular heating element 3 in the region of the introduction opening 19, i.e. a view into the receiving space 4 arranged in the interior space 5 of the heating element 3 or the heating region 7.

The internal diameter 27 of the heating element 3 and in particular of the heating region 7 shown in FIG. 4 is, in preferred variants of the invention, in the range from 20 mm to 70 mm. The wall thickness of the heating element 3, especially in the heating region 7, is advantageously a value in the range from 2 mm to 7 mm. The ratio of the internal diameter 27 of the heating element 3 to the external diameter 28 of the heating element 3 is, especially in the heating region 7, advantageously in a range from 1:1.2 to 1:1.5. The longitudinal extension of the heating region 7 in the longitudinal direction 13 of the heating element 3 is advantageously in the range from 20 mm to 70 mm, preferably from 30 mm to 60 mm.

LEGEND FOR THE REFERENCE NUMERALS

1 Sintering furnace
2 Workpiece
3 Heating element
4 Receiving space
5 Interior space
6 Slot
7 Heating region
8 Width
9 Width
10 Web
11 Thermally insulating material
12 Connecting region
13 Longitudinal direction
14 Slot
15 End
16 Electric connection
17 Longitudinal extension
18 Longitudinal extension
19 Introduction opening
20 Furnace door
21 Workpiece carrier
22 Chamber wall
23 Furnace chamber
24 Spacing
26 Linear guide
27 Internal diameter
28 External diameter
29 Wall thickness
30 Housing

The invention claimed is:

1. A sintering furnace for sintering dental workpieces, the sintering furnace comprises:
   a heating element having a receiving space for accommodating the workpiece during sintering, the receiving space is formed by a subregion of an interior space in an interior of the heating element;
   the heating element comprises silicon carbide;
   the heating element is at least in regions configured as slotted tube and a slot in the tube forming the heating element has a helical configuration in a heating region in which the heating element surrounds the receiving space;

the heating element has an introduction opening configured for introducing the workpiece to be sintered into the receiving space, and the introduction opening is closeable by a linearly movably mounted furnace door that is linearly moveable in a horizontal direction between an open position and a closed position;

a workpiece carrier fixed in a cantilever arrangement to the furnace door for movement together therewith, and the workpiece to be sintered is adapted to be introduced resting on the workpiece carrier into the receiving space and is adapted to be supported on the workpiece carrier during a sintering operation; and the slotted tube of the heating element is arranged with a horizontally extending longitudinal axis in an operating position of the sintering furnace;

wherein the workpiece is placeable on the workpiece carrier in the open position and is horizontally moveable with the door as the door moves to the closed position to a center area of the receiving space within the heating element; and wherein heating element comprises a connecting region in addition to the heating region, and a ratio of a longitudinal extension of the heating region in the longitudinal direction of the heating element to a longitudinal extension of the connecting region is from 1:2 to 1:4.

2. The sintering furnace as claimed in claim 1, wherein at least in the heating region in which the slot in the tube has the helical configuration, a ratio of a width of the slot to a width of a web of the slotted tube arranged between two adjacent sections of the slot is in a range from 1:1 to 1:10.

3. The sintering furnace as claimed in claim 1, wherein the interior space in the interior of the heating element is, apart from the receiving space, filled at least partly with thermally insulating material.

4. The sintering furnace as claimed in claim 1, wherein the heating element is arranged horizontally in an operating position of the sintering furnace.

5. The sintering furnace as claimed in claim 1, wherein slots which are elongated in a longitudinal direction of the heating element are located in the tube forming the heating element in the connecting region.

6. The sintering furnace as claimed in claim 5, further comprising electric connections of the heating element at an end of the connecting region opposite the heating region.

7. The sintering furnace as claimed in claim 1, further comprising a chamber wall composed of thermally insulating material, and a furnace chamber surrounded by the chamber wall, and the heating element is arranged in the furnace chamber and the chamber wall is at a distance from the heating element at least in regions in the heating region.

8. The sintering furnace as claimed in claim 1, wherein the heating element consists of silicon carbide.

* * * * *